United States Patent
James

(10) Patent No.: US 9,401,012 B2
(45) Date of Patent: Jul. 26, 2016

(54) METHOD FOR CORRECTING PURPLE DISTORTION IN DIGITAL IMAGES AND A COMPUTING DEVICE EMPLOYING SAME

(71) Applicant: Athentech Technologies Inc., Calgary (CA)

(72) Inventor: Brian G. James, Vernon (CA)

(73) Assignee: Athentech Technologies Inc., Calgary (CA)

( * ) Notice: Subject to any disclaimer, the term of this patent is extended or adjusted under 35 U.S.C. 154(b) by 375 days.

(21) Appl. No.: 14/057,807

(22) Filed: Oct. 18, 2013

(65) Prior Publication Data

US 2014/0112581 A1    Apr. 24, 2014

Related U.S. Application Data

(60) Provisional application No. 61/715,805, filed on Oct. 18, 2012.

(51) Int. Cl.
*G06T 5/00* (2006.01)
*H04N 5/357* (2011.01)
*H04N 9/04* (2006.01)

(52) U.S. Cl.
CPC .............. *G06T 5/006* (2013.01); *H04N 5/3572* (2013.01); *H04N 9/045* (2013.01); *G06T 2207/10024* (2013.01)

(58) Field of Classification Search
USPC ......................................................... 382/167
See application file for complete search history.

(56) References Cited

U.S. PATENT DOCUMENTS

| | | | | |
|---|---|---|---|---|
| 6,885,380 B1 * | 4/2005 | Primerano | ........... | G09G 3/3208 345/589 |
| 7,327,877 B2 * | 2/2008 | Kita | ........... | H04N 1/62 382/167 |
| 7,529,405 B2 * | 5/2009 | Masuno | ........... | H04N 1/58 382/162 |
| 7,577,292 B2 | 8/2009 | Kang | | |
| 7,656,437 B2 * | 2/2010 | Yamada | ........... | H04N 9/045 348/228.1 |
| 8,094,933 B2 * | 1/2012 | Cok | ........... | G09G 3/2003 345/694 |
| 8,229,217 B2 * | 7/2012 | Fujiwara | ........... | H04N 1/58 345/589 |
| 8,358,835 B2 * | 1/2013 | Song | ........... | G06T 5/006 382/162 |
| 9,013,609 B2 * | 4/2015 | Inoue | ........... | G06K 9/36 348/241 |
| 9,147,230 B2 * | 9/2015 | Saito | ........... | G06T 5/002 |

OTHER PUBLICATIONS

"Automatic Detection and Correction of Purple Fringing Using the Gradient Information and Desaturation," by Baek-Kyu Kim, et al., published in 16th European Signal Processing Conference (EUSIPCO 2008), Aug. 25-29, 2008.

* cited by examiner

*Primary Examiner* — Ishrat I Sherali
(74) *Attorney, Agent, or Firm* — Goodwin Law; Sean W. Goodwin

(57) ABSTRACT

A computing device and a method for correcting color distortion are provided, in particular for correcting purple flare. A digital image has an array of pixels each represented by a green (G), a red (R) and a blue (B) primary color, and for each pixel, the computing device establishes a minimum value between the R and B intensity values, and compares the minimum value and the G intensity value. The original R, G and B intensity values are maintained if the G intensity value is equal or greater than the minimum value. The R and B intensity values are attenuated by an adjustment value if the G intensity value is less than the minimum value. The adjustment value is calculated as the difference of the minimum value and the G intensity value.

26 Claims, 15 Drawing Sheets
(2 of 15 Drawing Sheet(s) Filed in Color)

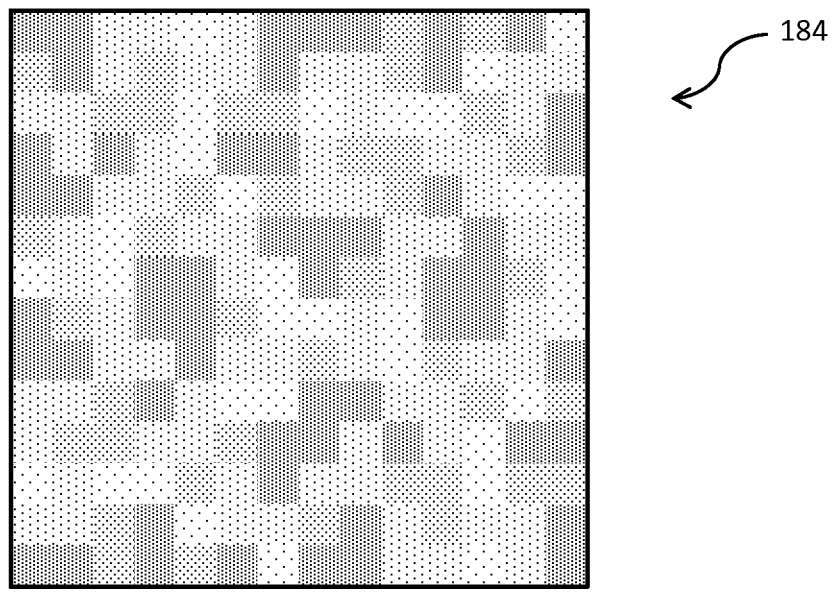
FIG. 5 Zoom-in of a purple portion of the picture
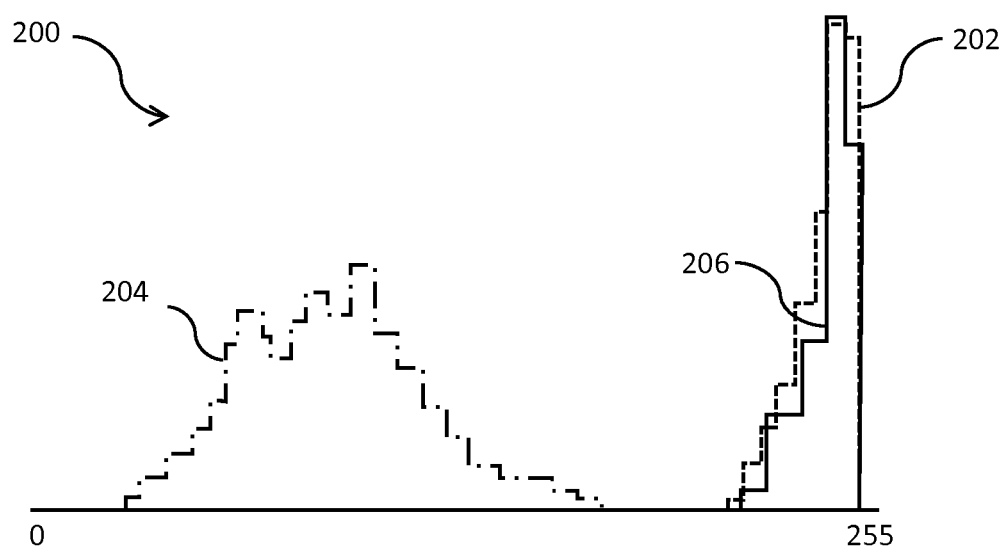
FIG. 6

```
For i = 1 To phot_wdth_i
 For j = 1 To phot_hght_i
  red__i = phot_ua(i, j).red__i
  gren_i = phot_ua(i, j).gren_i
  blue_i = phot_ua(i, j).blue_i
  comm_i = red__i
  If comm_i > blue_i Then comm_i = blue_i If gren_i <= comm_i Then
   adju_i = comm_i - gren_i
  Else
   adju_i = 0
  End If red2_i = red__i - adju_i
  grn2_i = gren_i
  blu2_i = blue_i - adju_i
  phot_ua(i, j).red__i = red2_i
  phot_ua(i, j).gren_i = grn2_i
  phot_ua(i, j).blue_i = blu2_i
 Next j
Next i
```

FIG. 9

|  | Before processing ||| C | A | After processing |||
|---|---|---|---|---|---|---|---|---|
|  | R | G | B |  |  | R | G | B |
| P1 | 100 | 150 | 200 | 100 | 0 | 100 | 150 | 200 |
| P2 | 150 | 50 | 200 | 150 | 100 | 50 | 50 | 100 |
| P3 | 250 | 50 | 250 | 250 | 200 | 50 | 50 | 50 |

```
For i = 1 To phot_wdth_i
 For j = 1 To phot_hght_i
  red__i = phot_ua(i, j).red__i
  gren_i = phot_ua(i, j).gren_i
  blue_i = cint(csng(phot_ua(I,j).blue_i)*red__divd_blue_sign_1)
  comm_i = red__i
  If comm_i > blue_i Then comm_i = blue_i If gren_i <= comm_i Then
   adju_i = comm_i - gren_i
  Else
   adju_i = 0
  End If red2_i = red__i - adju_i
  grn2_i = gren_i
  blu2_i = blue_i - adju_i
  phot_ua(i, j).red__i = red2_i
  phot_ua(i, j).gren_i = grn2_i
  phot_ua(i, j).blue_i=cint(csng(blu2_i)/red__divd_blue_sign_1)
 Next j
Next i
```

FIG. 14

```
For i = 1 To phot_wdth_i - 1
  For j = 1 To phot_hght_i - 1
    phot_smth_ua(i, j).red__i = (phot_ua(i, j).red__i
        + phot_ua(i + 1, j).red__i
        + phot_ua(i, j + 1).red__i
        + phot_ua(i + 1, j + 1).red__i) \ 4 phot_smth_ua(i, j).gren_i = (phot_ua(i, j).gren_i
        + phot_ua(i + 1, j).gren_i
        + phot_ua(i, j + 1).gren_i
        + phot_ua(i + 1, j + 1).gren_i) \ 4
    phot_smth_ua(i, j).blue_i = (phot_ua(i, j).blue_i
        + phot_ua(i + 1, j).blue_i
        + phot_ua(i, j + 1).blue_i
        + phot_ua(i + 1, j + 1).blue_i) \ 4
  Next j
Next i For i = 1 To phot_wdth_i - 1
  For j = 1 To phot_hght_i - 1
    phot_ua(i, j) = phot_smth_ua(i, j)
  Next j
Next i
```

FIG. 18

METHOD FOR CORRECTING PURPLE DISTORTION IN DIGITAL IMAGES AND A COMPUTING DEVICE EMPLOYING SAME

FIELD OF THE DISCLOSURE

The present disclosure generally relates to a computing device and a method for manipulating digital images, and in particular, relates to a computing device and a method for removing strong color and more particularly for correcting purple distortion in digital images.

BACKGROUND

Flare phenomenon is known in digital photography, particularly occurring in the instances of bright sources of light such as the sun, positioned just outside the image frame. In single lens reflex (SLR) cameras, this often manifests as a polygonal bright region in addition to bright streaks emanating from the source of the light. In other types of cameras, the result is primarily bright streaks. For example, in camera-equipped smart phones such as Apple® iPhone® 5, some versions of iPhone® 4S, and some Android™ phones, flare artifacts take on a purple hue or purple distortion.

Purple streaks often result when a strong light source, such as the sun, is just outside of the camera's field of view. When a camera substantially faces the strong light source (at an angle) and captures an image, unwanted light from the light source enters the camera's lens and is reflected multiple times between the surfaces of the one or more lens elements of the lens, which distort the color of the light reflected thereon. The unwanted, multiple-reflected light is then captured by the image sensor behind the lens, and appears on the captured image as purple streaks.

Methods and tools for correcting purple distortion are also known. For example, Adobe® Photoshop® allows users to reduce the saturation value of a portion of an image having purple fringe to reduce purple distortion. However, while purple artifacts are reduced, nearby pixels originally unaffected by purple distortion are also modified with reduced saturation. Many professional skills are applied and developed in the attempt to correct artifacts while avoiding reducing the saturation value of pixels unaffected by purple distortion.

U.S. Pat. No. 7,577,292, entitled "Automatic Removal of Purple Fringing from Images," to Kang, and assigned to Microsoft Corporation, discloses an automatic purple fringing removal system and method for automatically eliminating purple-fringed regions from high-resolution images. The automatic purple fringing removal system and method automatically detect a purple-fringed region in an image and then automatically correct the region. Automatic detection is achieved by finding near-saturated regions and candidate regions, and then defining a purple-fringed region as a candidate region adjacent a near-saturated region. Automatic correction of a purple-fringed region is performed by replacing color pixels in the region with at least some fully monochrome pixels using a feathering process, a monochrome averaging process, or by setting each of the red and blue intensity values by the summation of a down-scaled value of the original intensity value and a down-scaled value of the green intensity value. In short, a region is modified, including pixels not subject to the purple fringe.

An academic paper entitled "Automatic Detection and Correction of Purple Fringing Using the Gradient Information and Desaturation," by Baek-Kyu Kim, et al., published in 16th European Signal Processing Conference (EUSIPCO 2008), Lausanne, Switzerland, Aug. 25-29, 2008, discloses a method to automatically detect and correct purple fringing that is one of the color artifacts due to characteristics of charge coupled device sensors in a digital camera. The disclosed method consists of two steps. The first step detects purple fringed regions that satisfy specific properties, namely hue characteristics around highlight regions with large gradient magnitudes. In the second step, color correction of the purple fringed regions is made by desaturating the pixels in the detected regions. The disclosed method can be used as a post-processing step in a digital camera.

Although the above mentioned methods can correct purple distortion to some extent, disadvantages still exist. For example, some methods require careful manual manipulation of images based on professional knowledge of photography, which applies a huge burden to users and may not be suitable for most. Some other methods exploit complex algorithms and require a computational capacity that may not be applicable to many computing systems such as smart phones and point-and-shoot digital cameras.

Therefore, there still exists a need for a system and method for easily and efficiently correcting purple distortion in digital images.

SUMMARY

According to one aspect of this disclosure, a method for removing color distortion from a digital image for forming an adjusted, color distortion corrected image is disclosed, the method comprising: selecting an array of pixels from the digital image or portion thereof, each pixel being represented by a first, a second and a third primary color, each primary color having an intensity value; for each original pixel in the array: establishing a minimum value between the intensity values of the second and the third primary colors; comparing the minimum value and the intensity value of the first primary color, and where the intensity value of the first primary color is equal to or greater than the minimum value, establishing an adjusted pixel with the intensity values of the three primary colors equal to those of the original pixel, and where the intensity value of the first primary color is less than the minimum value, establishing an adjustment value, the adjustment value being the difference of the minimum value and the intensity value of the first primary color; attenuating the intensity value of the second primary color by the adjustment value, and attenuating the intensity value of the third primary color by the adjustment value for establishing an adjusted pixel, having the original intensity value for the first primary color and attenuated intensity values for the second and third primary colors; and repopulating the array with the adjusted pixels for forming the adjusted, color distortion corrected image.

According to another aspect of this disclosure, the method further comprises: scaling at least one of the intensity values of the second and third primary colors by multiplying a respective scaling factor thereto, before establishing the minimum value; and inversely scaling the intensity value of the at least one scaled primary color by multiplying the inverse of the respective scaling factor, after the intensity value of the at least one scaled primary color is attenuated.

According to yet another aspect of this disclosure, the method further comprises: filtering said digital image or portion thereof to compensate for image sensor introduced artifacts before removing color distortion therein.

According to still another aspect of this disclosure, the first, second and third primary color are green, red and blue, respectively, and the color distortion is purple.

According to another aspect of this disclosure, a computing device for removing color distortion from a digital image for forming an adjusted, color distortion corrected image is disclosed, the computing device comprising: a processing structure; and a storage functionally coupled to said processing structure and storing said digital image; said processing structure executing computer-executable code for selecting an array of pixels from the digital image or portion thereof, each pixel being represented by a first, a second and a third primary colors, each primary color having an intensity value; processing each pixel of the selected pixels to remove color distortion; and repopulating the array with the adjusted pixels for forming the adjusted, color distortion corrected image; wherein said processing comprises: establishing a minimum value between the intensity values of the second and the third primary colors; comparing the minimum value and the intensity value of the first primary color, and where the intensity value of the first primary color is equal to or greater than the minimum value, establishing an adjusted pixel with the intensity values of the three primary colors equal to those of the original pixel, and where the intensity value of the first primary color is less than the minimum value, establishing an adjustment value, the adjustment value being the difference of the minimum value and the intensity value of the first primary color; attenuating the intensity value of the second primary color by the adjustment value, and attenuating the intensity value of the third primary color by the adjustment value for establishing an adjusted pixel, having the original intensity value for the first primary color and attenuated intensity values for the second and third primary colors.

According to another aspect, this disclosure discloses a computer-readable storage device comprising computer-executable instructions for removing purple flare from a digital image for forming an adjusted de-purpled image, wherein the instructions, when executed, cause a processor to perform actions comprising: selecting an array of pixels from the digital image or portion thereof, each pixel being represented by a green, a red and a blue primary color, each primary color having an intensity value; and processing each pixel of the selected pixels to remove color distortion; and repopulating the array with the adjusted pixels for forming the adjusted, color distortion corrected image; wherein processing each pixel of the selected pixels comprises: establishing a minimum value between the red and blue intensity values; comparing the minimum value and the green intensity value, and where the green intensity value is equal to or greater than the minimum value, establishing an adjusted pixel with the intensity values of the three primary colors equal to those of the original pixel, and where the green intensity value is less than the minimum value, establishing an adjustment value, the adjustment value being the difference of the minimum value and the green intensity value; attenuating the red intensity value by the adjustment value, and attenuating the blue intensity value by the adjustment value for establishing an adjusted pixel, having the original green intensity value and attenuated red and blue intensity values.

According to another aspect of this disclosure, a method for removing color distortion from a digital image for forming an adjusted, color distortion corrected image is disclosed, the method comprising: selecting an array of pixels from at least a portion of the digital image, each pixel comprising at least a first, a second and a third primary color, each primary color having an intensity value; for each original pixel in the array: establishing a minimum value being the minimum intensity values of a group of colors comprising at least the second and the third primary colors; comparing the minimum value and the intensity value of the first primary color, and where the intensity value of the first primary color is equal to or greater than the minimum value, establishing an adjusted pixel with the intensity values of all primary colors equal to those of the original pixel, and where the intensity value of the first primary color is less than the minimum value, establishing an adjustment value, the adjustment value being the difference of the minimum value and the intensity value of the first primary color; attenuating the intensity value of each of the group of colors by the adjustment value for establishing an adjusted pixel, having attenuated intensity values for the group of colors and the original intensity value for other colors; and repopulating the array with the adjusted pixels for forming the adjusted, color distortion corrected image.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIG. 5 shows a zoomed-in illustration of a purple streak sample of FIG. 4;

FIG. 6 is a histogram showing a representation of the intensity of the R, G and B colors for the purple streak sample in FIG. 5;

FIG. 9 shows a portion of sample code for correcting purple color distortion according to one embodiment;

FIG. 14 shows a portion of sample code for correcting purple color distortion according to the alternative embodiment shown in FIG. 13;

FIG. 18 shows a portion of sample code for pre-processing an image using a moving average filter;

DETAILED DESCRIPTION

Generally, a computing device and a method for manipulating digital images is provided, the method being applied for the removal of strong color such as color distortion. In an embodiment, purple distortion is removed or corrected in digital images suffering from purple flare phenomenon.

Figure 1:
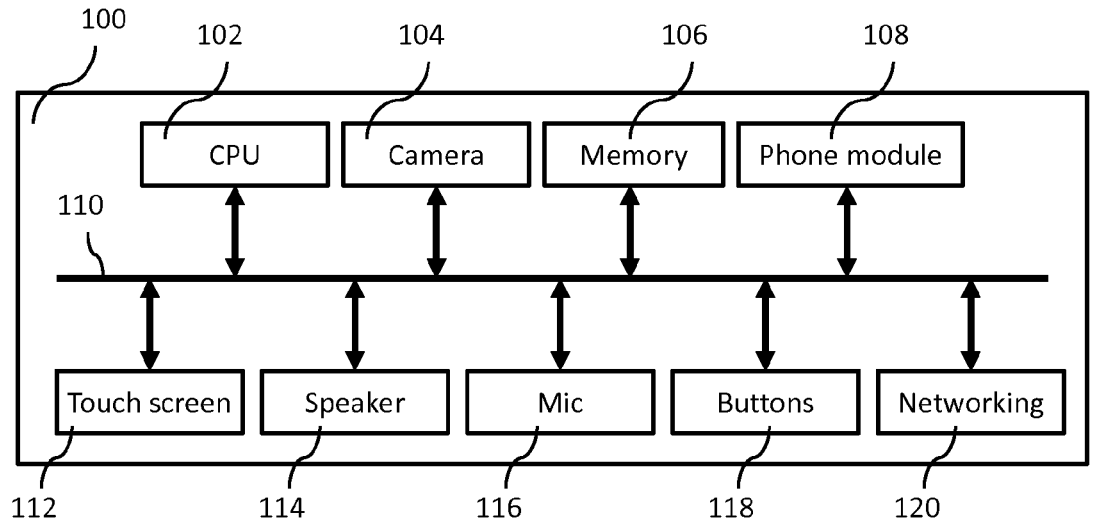
FIG. 1 illustrates a high-level hardware structure of a computing device according to one embodiment.

Turning to FIG. 1, a computing device 100 is illustrated. In one embodiment, the computing device 100 is a smart phone having photographic capability.

The computing device 100 comprises a central processing unit (CPU) 102, functionally coupling via a bus 110 to an imaging device such as a camera 104. In this embodiment, the imaging device 104 is integrated to the computing device 100. The CPU is also functionally coupled via the bus 110 to a storage or memory 106 such as Read-Only Memory (ROM), volatile and/or non-volatile Random Access Memory (RAM), solid state drive, hard drive, or the like. The CPU 102 is further coupled via the bus 110 to a phone module 108, a touch sensitive screen 112 for displaying information thereon and for receiving user input therefrom, one or more speakers 114, one or more microphones 116, one or more buttons 118, a networking module 120 for connecting to a network such as the Internet, or another device via wired or wireless means, e.g., WiFi®, Bluetooth®, USB™, FireWire®, Thunderbolt™, Lightning™, or the like.

Figure 2:
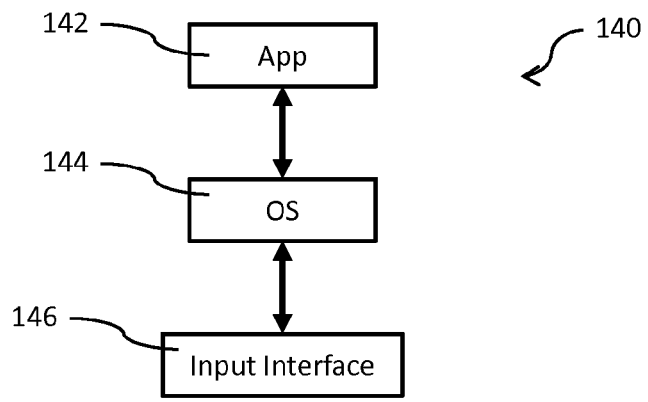
FIG. 2 illustrates a software structure of the computing device of FIG. 1.

The CPU 102 may execute code stored in the storage 106 to control various hardware components 102 to 120, and to perform user designated tasks. FIG. 2 illustrates the software structure 160 of the computing device 100. As shown, the computing device 100 further comprises an operating system 144, e.g., Apple® IOS™, Android™, Windows Mobile, BlackBerry OS, or the like. Generally, the operating system 144 is a set of computer readable code executed by the CPU 102 for managing various hardware and software components of the computing device 100, and for supporting the execution of application programs or "apps" 142. As shown, the operating system 144 controls hardware components via an input/output interface 146. The operating system 144 also supports one or more apps 142 to be executed by the CPU 102.

Figure 3:
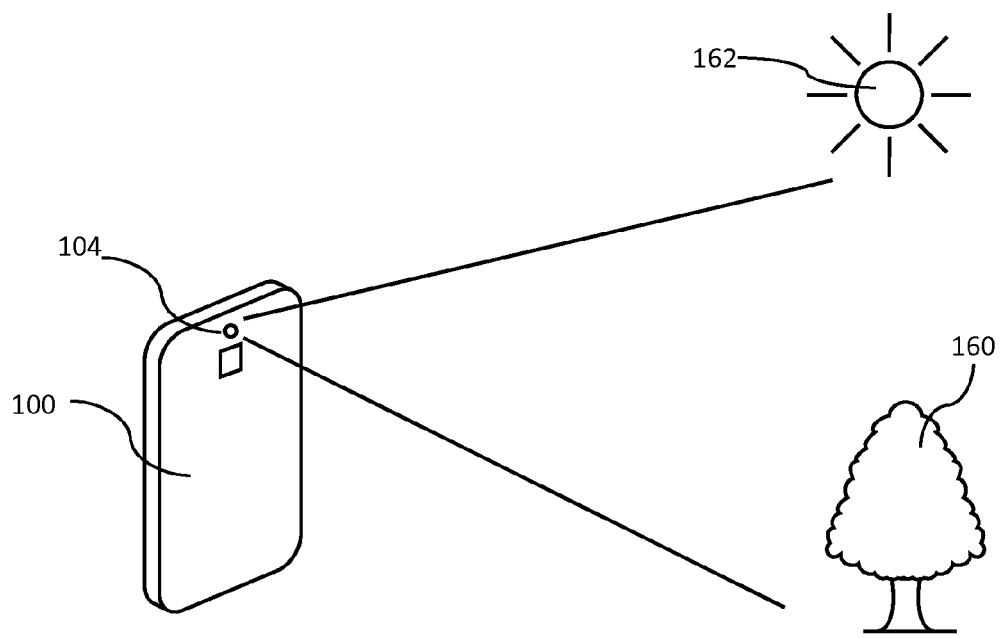
FIG. 3 illustrates a computing device such as a smart phone capturing an image of a scene using its onboard camera.
Figure 4:
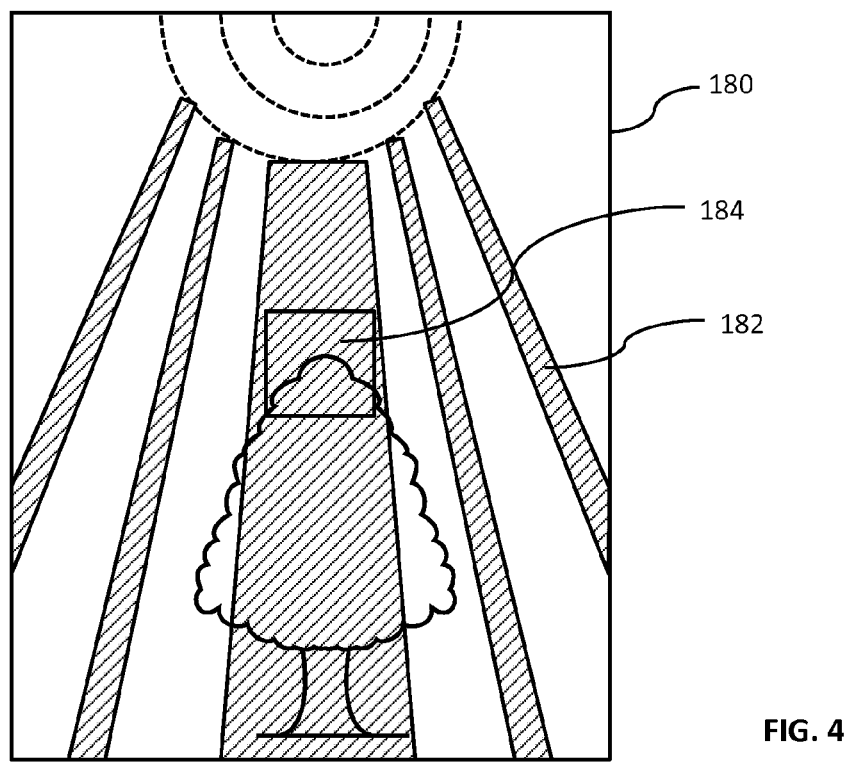
FIG. 4 shows a fanciful line-drawn representation of a captured image from the device of FIG. 3, having purple streaks.
Figure 20:
FIG. 20 is a color photograph having purple streaks.

In this embodiment, the CPU 102 executes an app 142 to control the camera 104 to capture an image of a scene. As shown in FIG. 3, the camera 102, while capturing an image of a scene 160, faces a strong light source 162 such as the sun substantially directly or at an angle. As shown in FIG. 4, although the light source 162 is outside of the camera's field of view, purple streaks 182 (illustrated by the hatching), which represent unwanted color distortion, appear on the captured image 180. One may review FIG. 20 for a photographic example of an image 180 having such color distortion.

In this embodiment, an image is captured on an image sensor, such as a charge-coupled device (CCD) or a complementary metal-oxide semiconductor (CMOS) image sensor. The captured image is stored in the storage 106 as a set of pixels. In the large majority of instances, each image pixel is represented by a first, a second and a third primary color, such as Green (G), Red (R), and Blue (B), which may be denoted as (R, G, B). Each of the primary colors takes an intensity value between zero (0) and 255, with zero (0) representing weakest color intensity, and 255 representing strongest color intensity. As is well known in the prior art, the mixture of R, G and B colors having different intensity values results in different colors. For example, a pixel having zero (0) R, G and B intensity values, denoted as (0, 0, 0), shows as black, and a pixel having maximum R, G and B intensity values, i.e. (255, 255, 255), shows as white.

An enlarged illustration of a representation of a purple streak sample 184 in image 180 is shown in FIG. 5. As can be seen by the naked eye, although the intensity of the pixels in the purple streak 184 varies, all pixels exhibit same or similar purple color. As illustrated by the histogram 200 in FIG. 6, the intensity value distributions 202, 204 and 206 of R, G, B colors, respectively, for the purple streak sample 184 shows that R and B have similar intensity value distributions 202 and 206 while the intensity value distribution 204 of G is significantly different.

As can be seen, the intensity value distributions 202 and 206 of R and B are close to a Gaussian or normal distribution mainly concentrating in the high intensity area. However, the intensity value distribution 204 of G has more variation, having multiple local peaks, three shown in this example, and is concentrated in a relatively lower intensity area with relatively more flat tops and wider width, compared to that of R or B. Examination of other purple streaks reveals similar observation.

Therefore, in this example, the purple artifact is the result of excessive purple color, being the mixture of red and blue added to the pixel, that biases the "real" color information, the term "real" being the color information if the pixel had not been biased by the purple color distortion. The similar intensity value distributions of R and B imply that the excessive purple color is a mixture of similar amount of red and blue.

In this embodiment, the app 142 comprises code for processing an image, including code for correcting purple color distortion based on above observation. When correcting color distortion of an image, the app 142 processes each pixel of the image without a need for any information of a region, neighboring pixels or other pixels thereof. Such an embodiment is also characterized by fast processing. For each pixel, the app 142 adjusts the R and B intensity values, respectively, but leaves the G value unchanged.

Figure 7:
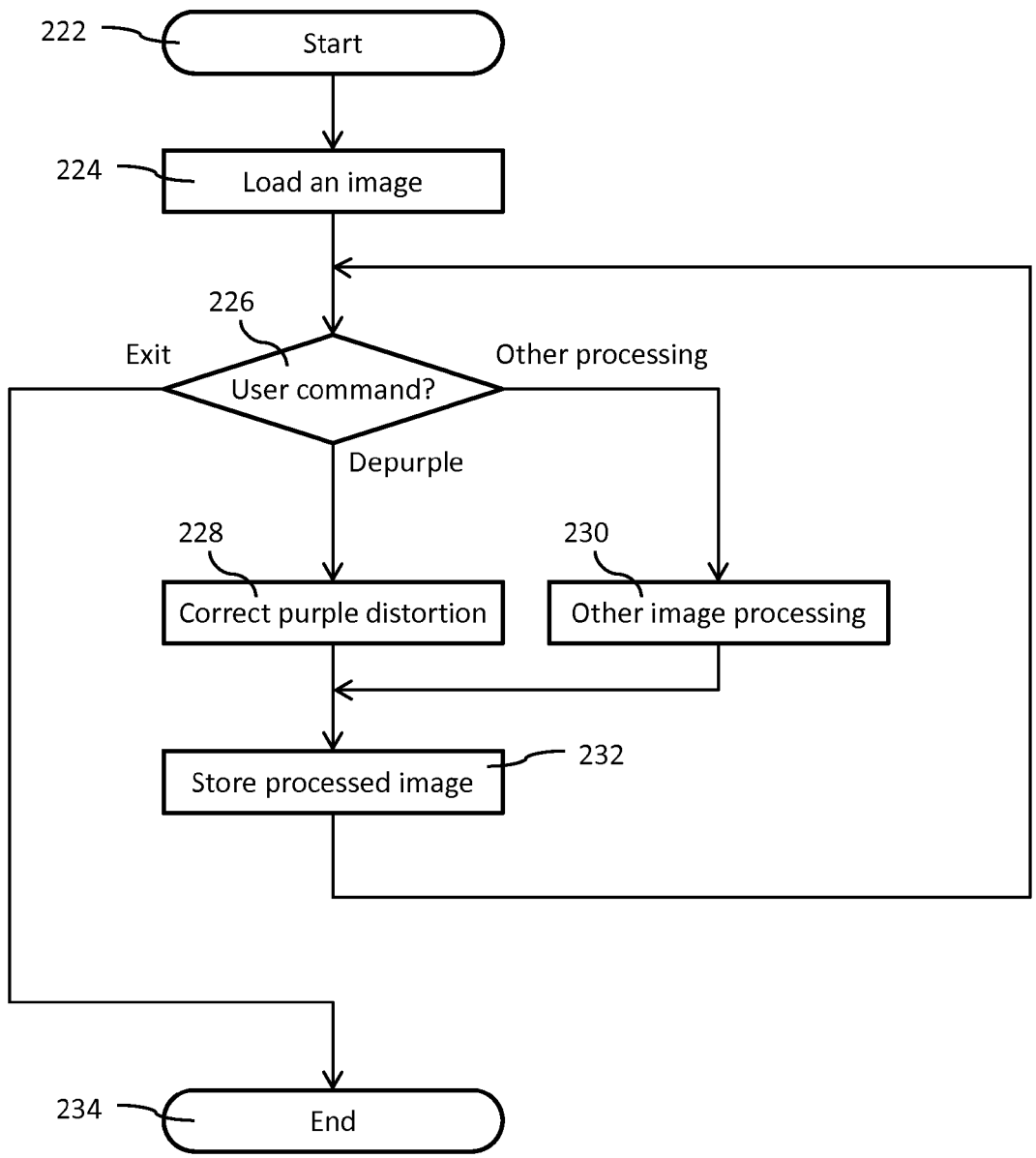
FIG. 7 is a flowchart illustrating steps executed by an app for processing an image according to one embodiment.

As illustrated in FIG. 7, after starting (step 222), the app 142 loads a pixel array of an image to be processed or a portion thereof (step 224). In this embodiment, the app 142, in response to the user's command, instructs the imaging device to capture an image of a scene and loads the captured image therefrom. As skilled persons would appreciate, the user may input a command to the app 142 via the touch screen 112, the microphone 116 using voice commands, or a button 118.

After loading the pixel array, the app 142 then waits for user's command (step 226). If an Exit command is received, the app 142 terminates its execution (step 234). If a command for other image processing is received, the app 142 then processes the pixel array accordingly (step 230). After processing, the app 142 stores the processed pixel array to the storage (step 232), and goes back to step 226 for receiving further user commands.

If, at step 226, a Depurple command, i.e., a command for correcting purple color distortion, is received, the app 142 corrects the purple color distortion (step 228) using embodiments described herein. Then, the app 142 stores the processed image to the storage (step 232), and goes back to step 226 for receiving further user commands.

Figure 8:
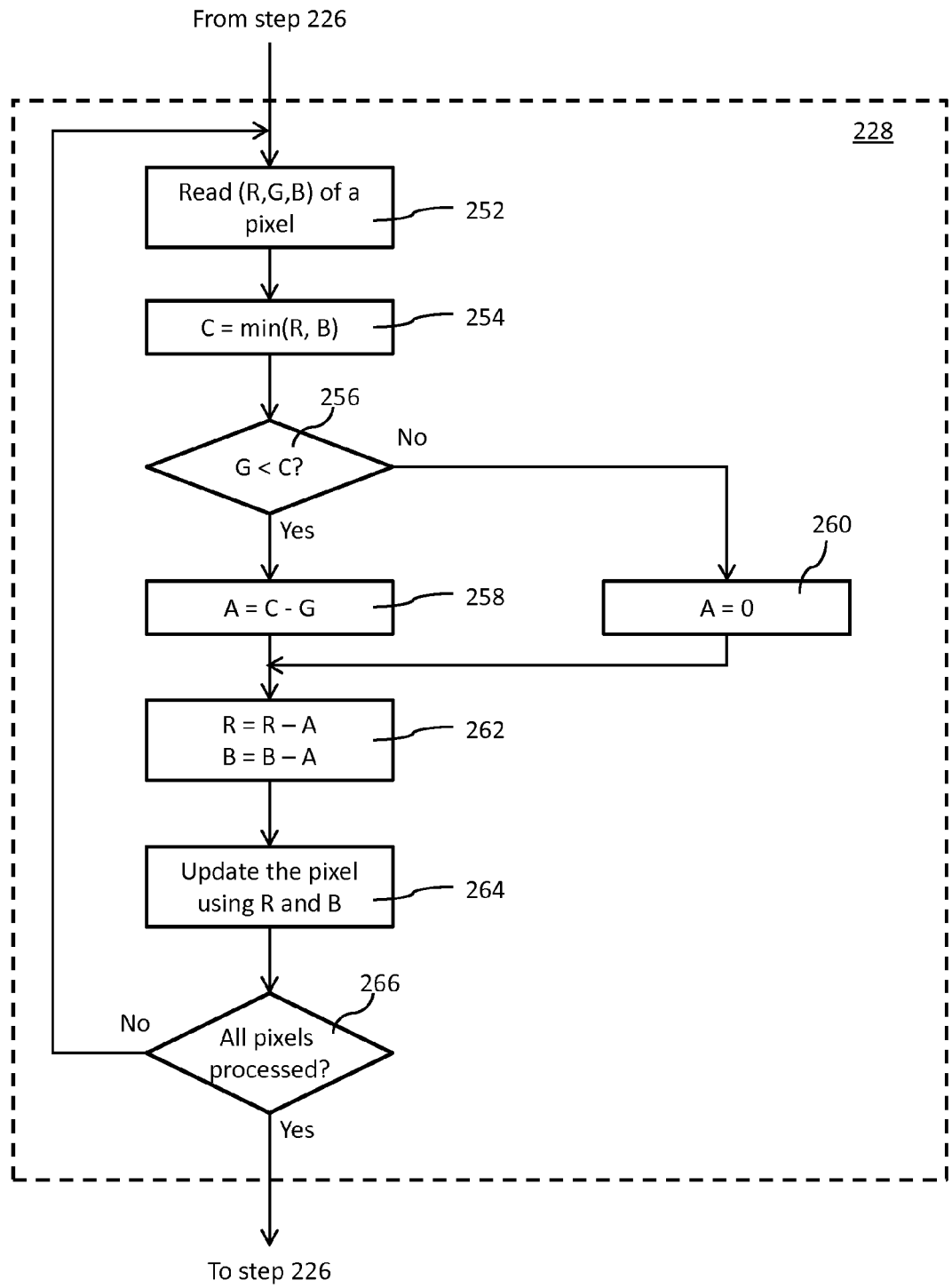
FIG. 8 is a flowchart illustrating a detailed view of the correcting purple color distortion step in FIG. 7.

As shown in detail in FIG. 8, in step 228, the app 142 processes each pixel in the image. FIG. 9 is a portion of sample code written in Microsoft® Visual Basic® programming language representing the step 228 set forth in FIG. 8. For each pixel, the app 142 reads the R, G and B intensity values of the pixel (step 252). Here, G is used as a base color for purple color distortion correction, and R and B are the distorted colors to be corrected. The app calculates a minimum C of the intensity of the distorted colors R and B of the pixel (step 254), and then checks if the intensity of base color G is less than the calculated minimum C (step 256). If the intensity of G is less than that of C, then a (R, B) color distortion is established and an adjustment value A is calculated as the difference between the intensities of C and G, i.e., $A=C-G$ (step 258); otherwise, the adjustment value A is set to zero (step 260) representing no adjustment or correction.

After the adjustment value A is determined, the app 142 attenuates or adjusts the values of the distorted colors R and B by subtracting A therefrom, respectively (step 262). The base color G value is unchanged. The app 142 establishes an adjusted pixel using the adjusted R and B values and the original G value. In other words, the adjusted pixel has the original G intensity value and attenuated R and B intensity values if the G intensity value is less than the minimum value C, and the R, G and B intensity values of the adjusted pixel are equal to those of the original pixel if the G intensity value is equal to or greater than the minimum value C.

The adjusted pixel can be written back to the array or later in a batch write process. The app ultimately repopulates the updated pixel to the pixel array (step 264). Then, the app 142 checks if all pixels have been processed (step 266), if not, the app 142 goes back to step 252 to read the R, G and B intensity values of another pixel.

If at step 266, the app 142 determines that all pixels have been processed, the processing of step 228 is then completed and the app 142 goes to step 226 to wait for further user commands.

The color distortion correction method described herein gives rise to different correction results to pixels depending on the extent that the color of a pixel, before color distortion correction, is biased by the purple distortion.

Figures 10, 11:
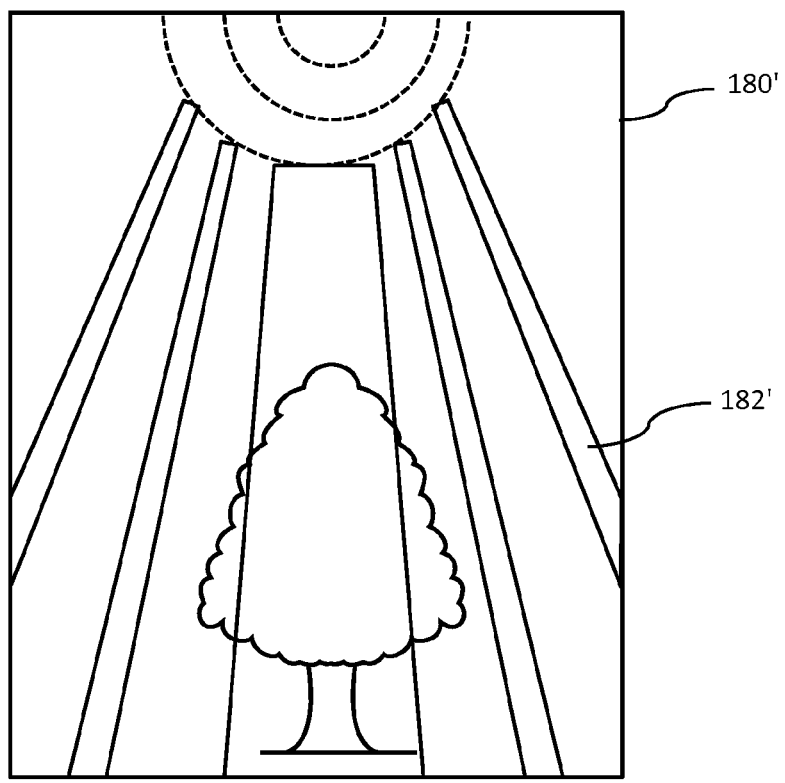
FIG. 10 shows some examples of the R, G and B intensity values of pixels before and after correcting purple color distortion, respectively.
FIG. 11 shows a line-drawn illustration of the image of FIG. 4 after correction of purple color distortion using methods described herein.

As shown in the examples of FIG. 10, example pixel P1 illustrates a pixel in which G intensity value is larger than either R or B, which means that the color of these pixels before processing is likely, or is close to, the "real" color thereof. Any excessive purple color appearing in such a pixel, if any, is either none or of a small amount. Accordingly, the app 142, following the color distortion correction method shown in FIG. 8, sets the adjustment value to zero (at step 260), and thus maintains the R, G and B intensity values of these pixels unchanged after processing.

Pixel P2 is an example of a pixel in which G intensity value is smaller than either both R and B, while the R value is also significantly different than the B value. The color of these pixels before processing exhibits large purple distortion, but having variance between intensities can retain identifiable information regarding their "real" color. The app 142 estimates the amount of the excessive purple color as the difference between G and the amount common to R and B, and corrects the purple color distortion by attenuating the R and B values by an estimated amount of the excessive purple color. One of R and B is adjusted to the same level as G. As a result, after processing, these pixels exhibit colors close to their respective "real" colors.

Figure 21:
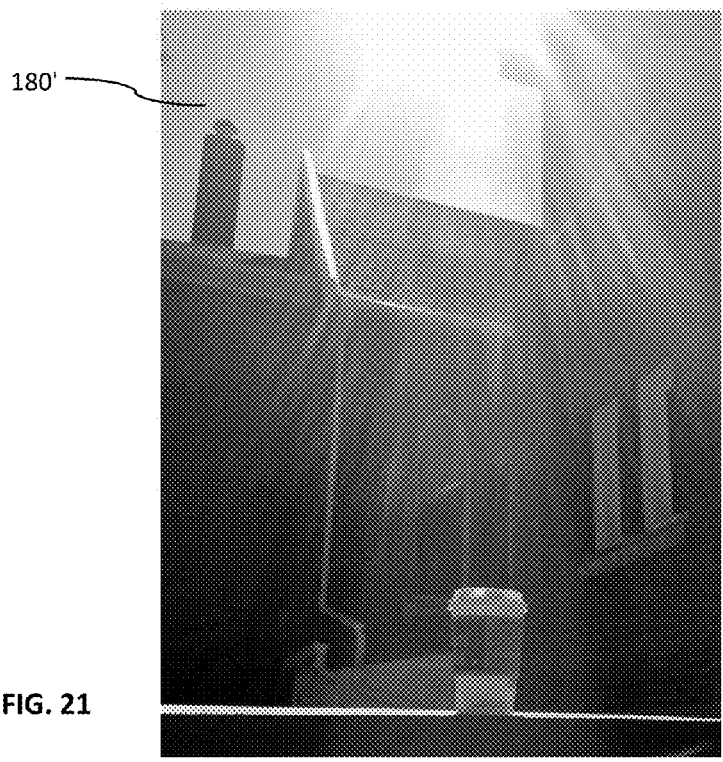
FIG. 21 is the color photograph in FIG. 20 after purple color distortion correction using embodiments described herein.

The pixel P3 in FIG. 10 is an example of a pixel dominated by purple color distortion, which generally occurs in the area of the image flooded by strong ambient light. As can be seen, the G intensity value, before processing, is smaller than both R and B, and the R and B values are similar and both strong. As the difference between R and B is small or non-existent, the "real" color information is largely lost. The app 142 estimates the amount of the excessive purple color as the difference between the G intensity value and the amount common to R and B, and corrects the purple color distortion by attenuating the R and B values by the estimated amount of excessive purple color. Both R and B are adjusted to about same level as G. As a result, after processing these pixels become generally grey with respective intensities (i.e., some may be dark grey and some may be light grey), which gives a less artificial effect to the naked eye than do the purple streaks resulting from the purple distorted pixels. An example of this effect can be seen in the color photograph 180' of FIG. 21.

The image 180', after correcting purple color distortion, is illustrated in FIG. 11, where the area 182' without hatching indicates the streaks that were purple but have been color corrected. As described before, the processed image 180' is stored to the storage 106. The processed image may also be displayed on the touch screen 112.

Figure 12:
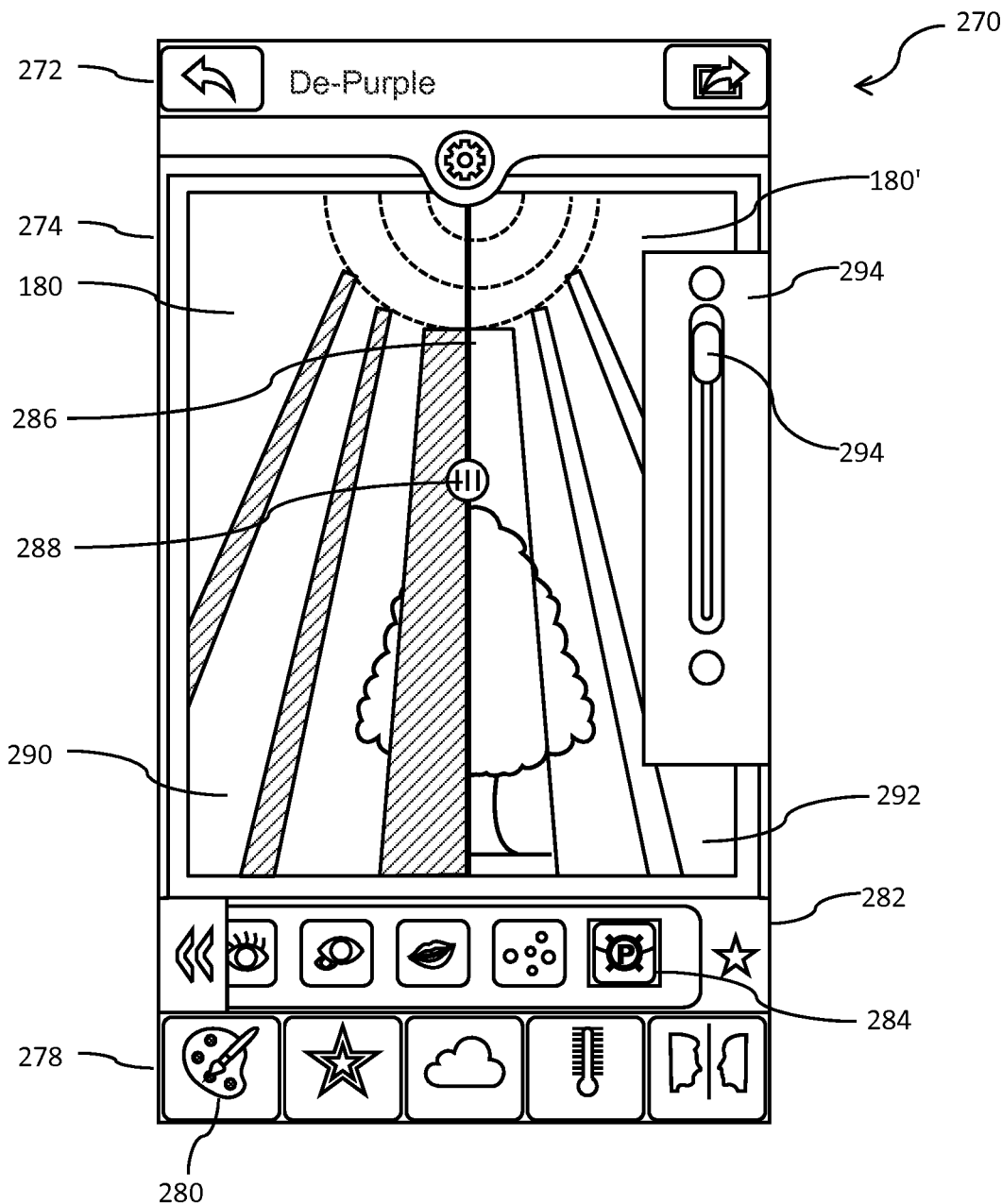
FIG. 12 shows a graphical user interface of an app running on a computing device for correcting purple color distortion, showing pre- and post-correction images.

FIG. 12 shows the graphical user interface (GUI) 270 of an app running on a portable computing device for processing images including correcting purple color distortion. In this example, the app is a version of the Perfectly Clear® app offered by Athentech Technologies of Calgary, Alberta, Canada, the assignee of the subject application, running on an Apple® iPhone® device. As shown, the GUI 270 comprises a header area 272 showing the current function, an image manipulation area 274 displaying an image 180 to be processed, a function zone 278 comprising function buttons including a tweak button 280. A user (not shown) may contact the touch screen at the position of the tweak button 280 to activate a toolbar 282 comprising additional function buttons including a depurple button 284. When the user touches the depurple button 284, the app automatically starts the process in FIGS. 8 and 9 for correcting purple color distortion.

The app also shows a vertical line 286 that divides the image manipulation area 274 into a left portion 290 and a right portion 292. The left portion 290 shows the image 180 before purple color distortion correction, and the right portion 292 shows the image 180' after purple color distortion correction. The user can thus easily compare the result of purple color distortion correction with the original image. The vertical line 286 also comprises a handle 288. The user may touch the handle 288 and slide the vertical line 286 towards the left or right hand side of the image manipulation area 274 to adjust the division between the left portion 290 and the right portion 292. The UI 270 also comprises a slider 294 for adjusting the scaling factor D used in color distortion correction described above. The user may slide the sliding block 296 to adjust the scaling factor D within a predefined range. The result of the scaling factor D is instantly shown in the right portion 292.

In above embodiment, the purple color distortion is considered as the addition of equal amount of red and blue, and thus the R and B values are attenuated, respectively, by the same adjustment amount. However, one notes that in some situations, the color distortion may be the addition of unequal amount of a strong red and a strong blue.

Accordingly, in an alternative embodiment, the R and B values are attenuated by different adjustment amounts, respectively. In this embodiment, the app 142 uses a scaling factor to determine the adjustment amount for each primary color to be adjusted. The scaling factor may be predefined, or alternatively user-adjustable. The steps performed by the app 142 in this alternative embodiment are the same as those shown in FIG. 7. The detail of step 228 in this embodiment however is slightly different than that shown in FIG. 8.

Figure 13:
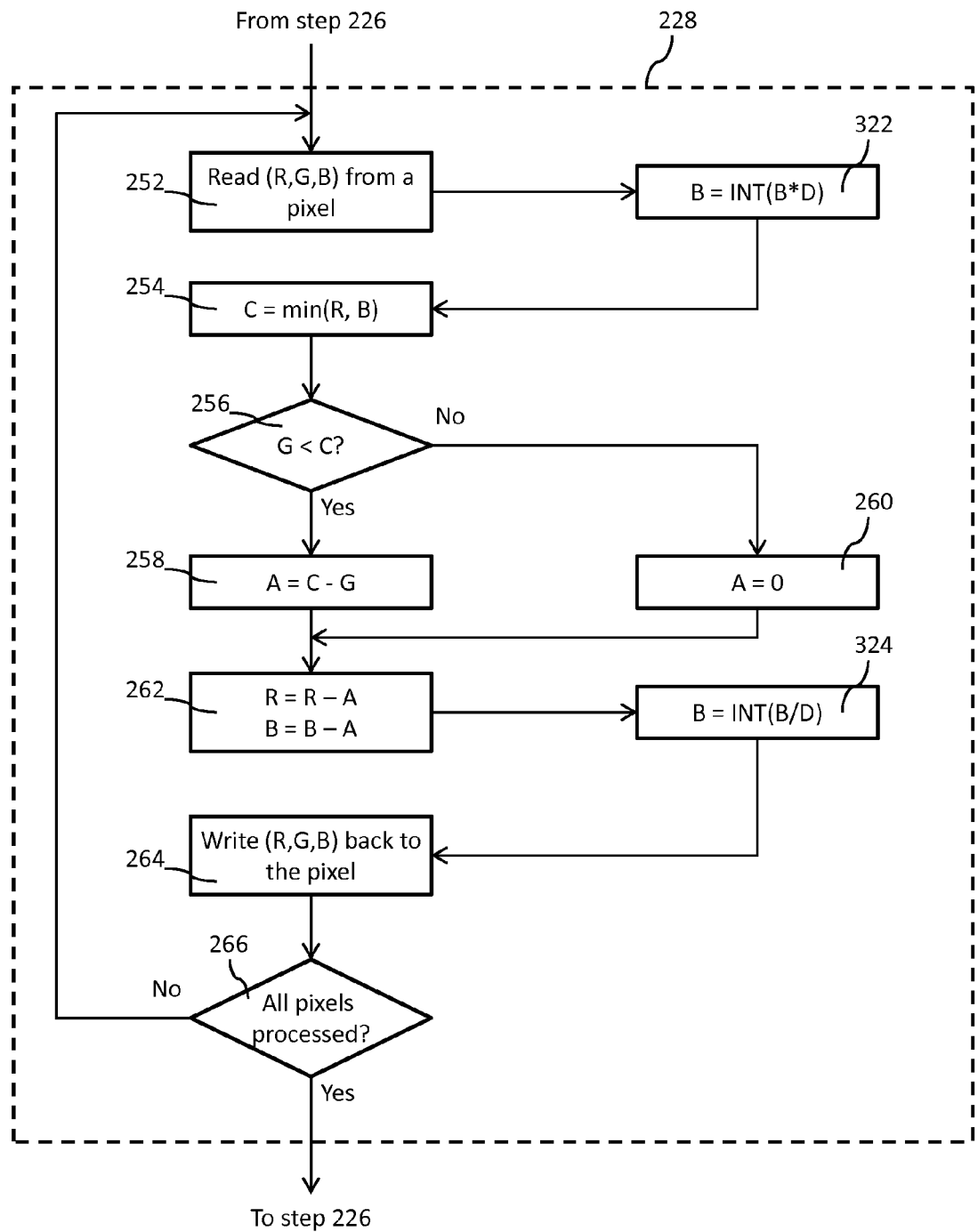
FIG. 13 shows details of the correcting purple color distortion step according to an alternative embodiment.

FIG. 13 shows the detail of step 228 in this embodiment, where the steps same as those in FIG. 8 are annotated with the same numeral. FIG. 14 is a portion of sample code written in Microsoft® Visual Basic® programming language representing the steps set forth in FIG. 13. As shown, the app 142 first read the R, G and B values of a pixel (step 252). Then, the app 142 uses a scaling factor D to scale the B value (step 322):

$$B=\text{INT}(B*D)$$

where INT(x) represents the integer function calculating the integer part of x. For simplicity, one might note that FIGS. 8 and 9 represent a scaling factor of one.

After scaling the B value, the app 142 calculates the minimum C for R and the scaled B (step 254). The app 142 then checks if the G value is smaller than C (step 256). If G is smaller than C, an adjustment value A is calculated as the difference between C and G, i.e., A=C−G (step 258); otherwise, the adjustment value A is set to zero (step 260).

After the adjustment value A is determined, the app 142 adjusts the R and B values by subtracting A therefrom, respectively. (step 262). The G value is unchanged. Then, the app 142 inversely scales B (step 324) by multiplying B by the inverse of D, i.e., by dividing B by D:

$$B=\text{INT}(B/D)$$

The app 142 updates the pixel using the adjusted R and B values and the original G value (step 264). The app 142 then checks if all pixels of the image have been processed (step 266), if not, the app 142 goes back to step 252 to read the R, G and B values of another pixel. If at step 266, the app 142 determines that all pixels have been processed, the processing of step 228 is then completed and the app goes to step 226 to wait for further user commands.

The scaling factor D determines the excessive color. In one embodiment, the scaling factor is based upon an assumption that the color artifact is a non-unitary fixed ratio of R divided by B. In some embodiments, the scaling factor D may be user adjustable within the range from about 0.1 to about 10, inclusive, preferably from about 0.5 to about 2, inclusive, and more preferably from about 0.75 to about 1.33, inclusive, although other ranges are also possible. In a related embodiment, the app 142 provides a user interface (UI), e.g., a slider, to facilitate users to select a preferred scaling factor D.

Additional corrections can be applied for further improvements to the image, in particular to minimize artifacts introduced by processes applied to common image sensors.

Figure 15A:
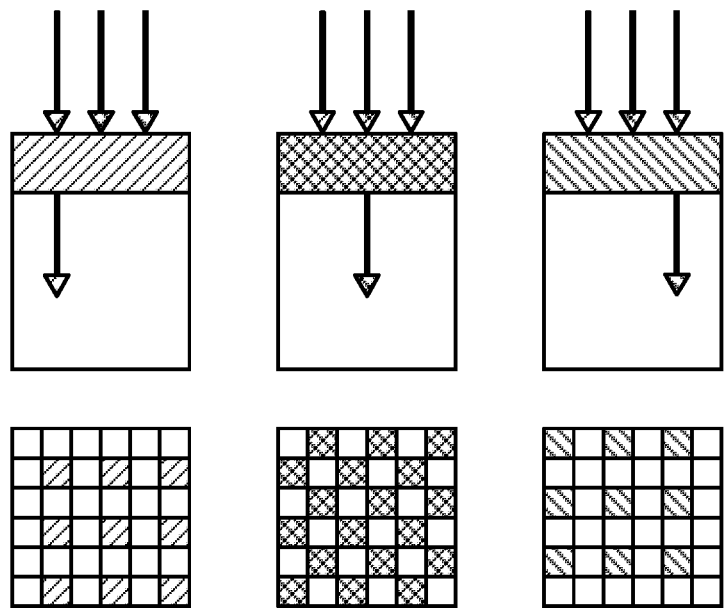
FIGS. 15A and 15B illustrate the BAYER pattern used in an imaging device, modified from images made by author "en:User:Cburnett" and presented in Wikipedia® under the terms of the GNU Free Documentation License, Version 1.2 or any later version published by the Free Software Foundation of Boston, Mass., USA; with no Invariant Sections, no Front-Cover Texts, and no Back-Cover Texts.
Figure 15B:
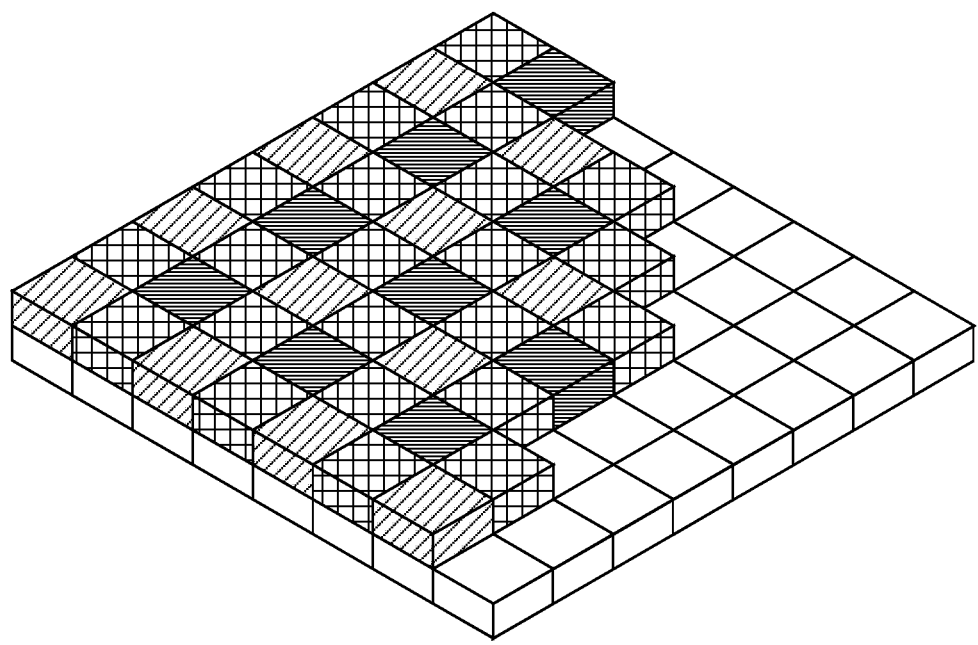

As shown in FIGS. 15A and 15B, both are obtained from Wikipedia®, and as is known to persons skilled in the art, the image sensor of many imaging devices consists of an array of light detectors, each capable of detecting red, green or blue color, arranged in a pattern, e.g., known as the Bayer pattern. More detail of the Bayer pattern or Bayer filter can be found in Wikipedia®, and in U.S. Pat. No. 3,971,065, entitled "Color imaging array" to Bayer, filed on Mar. 5, 1975, issued on Jul. 20, 1976, and assigned to Eastman Kodak Company.

Each imaging pixel on the image sensor (corresponding to a pixel in the captured image) consists of a number of light detectors. For example, in some imaging devices, an imaging pixel consists of one (1) red, two (2) green and one (1) blue light detectors arranged in a two (2) by two (2) grid. When capturing an image, the image sensor is exposed to light to detect light information. Raw data output from the image sensor is processed by using a process known as Demosaicing, to convert the raw data to an image compliant with an image standard, e.g., JPEG, JPEG 2000, PNG, GIF, BMP, or the like, depending on the design and user preference of the imaging device, by converting the data from the light detectors of each imaging pixel to the data of the corresponding pixel in the captured image.

Figure 16:
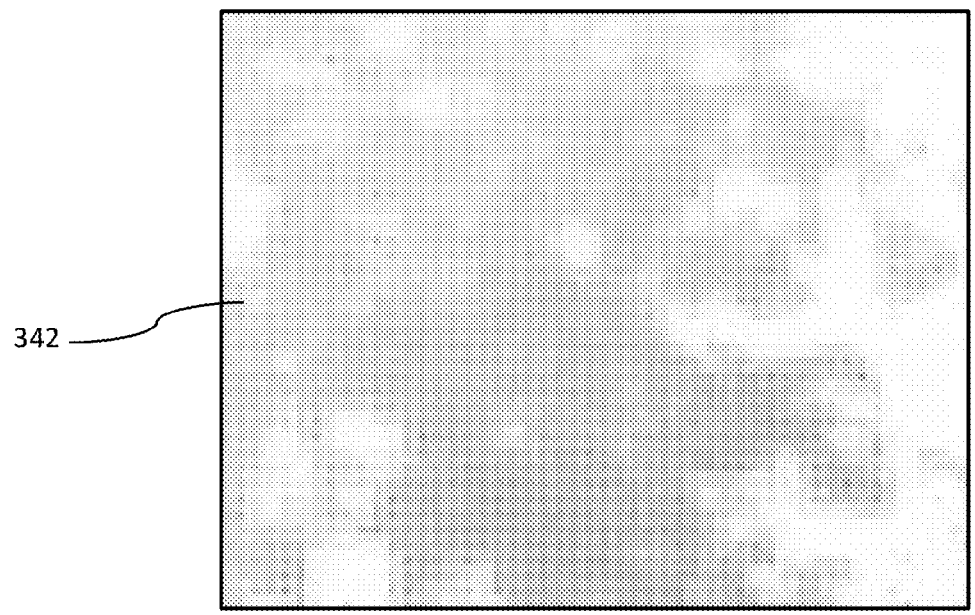
FIG. 16 is a portion of a color distortion-corrected color photograph exhibiting a checkerboard like, image sensor-introduced artifact.

In situations where a captured image comprises fine details comparable to a pixel in size, the Demosaicing process may introduce image sensor related artifacts into the image. Directly applying the above-described color distortion correction may cause, as shown in FIG. 16, a checkerboard like pattern 342 to appear on the processed image, which may be visible to users when being viewed at the full resolution.

Such an issue is caused by the Demosaicing process. Generally, the Demosaicing process is an interpolation process with consideration of all primary colors (red, green, blue). In an area heavily distorted by purple artifacts, the Demosaicing process obtains smooth R and B values across a number of pixels therein since the red and blue light detectors in this area output similar values. On the other hand, the output of green light detectors may fluctuate, and the Demosaicing process fails because the fluctuations of G are not consistent with R and B.

Figure 17:
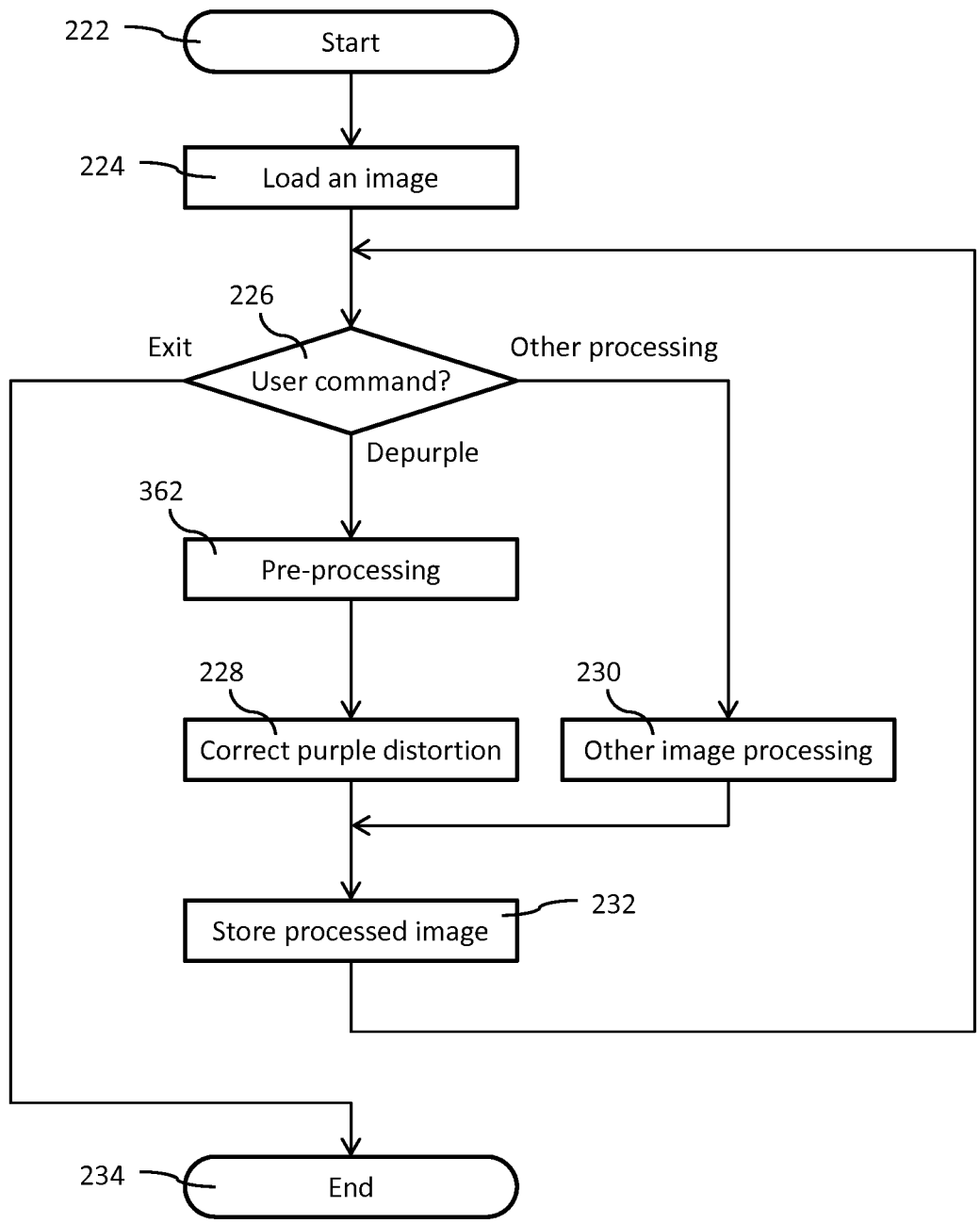
FIG. 17 is a flowchart illustrating the steps executed by an app for processing an image according to yet another embodiment.

In yet another embodiment, the app 142 pre-processes the image to compensate for the image sensor introduced artifacts. The flowchart of steps of processing an image in this embodiment is shown in FIG. 17. Compared to the process shown in FIG. 7, the app 142 performs a pre-processing step 362 after a Depurple command is received from the user. At this step, the app 142 filters the image by using a two (2) pixel by two (2) pixel moving average filter to smooth the image. As illustrated by the code written in Microsoft® Visual Basic® programming language in FIG. 18, the app 142 calculates each of the R, G and B values of a pixel by using the average of its own value and the values from three neighboring pixels, i.e., $$R\_(i,j)=(R\_(i,j)+R\_(i+1,j)+R\_(i,j+1)+R\_(i+1,j+1))\backslash 4$$

$$G\_(i,j)=(G\_(i,j)+G\_(i+1,j)+G\_(i,j+1)+G\_(i+1,j+1))\backslash 4$$

$$B\_(i,j)=(B\_(i,j)+B\_(i+1,j)+B\_(i,j+1)+B\_(i+1,j+1))\backslash 4$$

where R_(i,j), G_(i,j), B_(i,j) represent the R, G, B values of pixel (i,j), respectively, and "x\y" represent x being integer-divided by y, the result of which is the integer part of x/y, or equal to INT(x/y).

Figure 19:
FIG. 19 is a portion of the color photograph of FIG. 16 after pre-processing and color distortion correction.

After pre-processing, the app 142 then corrects color distortion of the pre-processed image as described above (step 228). The color distortion corrected image is then stored to the storage 106 (step 232 of FIG. 8 or 13). As shown in FIG. 19, the checkerboard artifact is significantly alleviated in the color distortion corrected image.

In this embodiment, the size of the moving average filter is selected to equal to the size of light detectors in each imaging pixel of the imaging sensor. However, other size of the moving average filter may be alternatively selected in other embodiments.

Those skilled in the art appreciate that other embodiments are readily available. For example, although in the embodiment shown in FIG. 13, the B value is scaled and then inversely scaled while no scaling is applied to the R value, those skilled in the art appreciate that, in an alternative embodiment, the R value is scaled and then inversely scaled while no scaling is applied to the B value. In a related embodiment, each of the R and B values is scaled by a respective scaling factor before calculating the minimum value, and inversely scaled by the respective scaling factor after its value is attenuated. Thus, the embodiment shown in FIG. 13 may be considered as a special case of this embodiment where the scaling factor for the R value is one.

In some alternative embodiments, the computing device 100 may take a variety of forms, such as a digital camera, personal digital assistant (PDA), tablet (e.g., an Apple® iPad® or an Android™ tablet), desktop or laptop personal computer (PC) or the like. The computing device 100 may also comprise a variety of hardware components such as an Ethernet interface, a serial port, a parallel port, a keyboard, a computer mouse, a trackball, a projector, and the like. Alternatively, the computing device 100 may not comprise all of, or some of, the hardware components described above (e.g., physical buttons, phone module, speaker, microphone, touch screen, networking module, and the like) and can still perform the aforementioned color distortion correction function. Those skilled in the art appreciate that the computing device 100 may execute an operating system, e.g., Windows®, DOS, Mac OS®, Linux®, and aforementioned operating systems such as Apple® IOS™.

Although in above embodiments, the imaging device 104 is integrated into the computing device 100, in an alternative embodiment, the imaging deice 104 is a device separated from the computing device 100. In this embodiment, the imaging device 104 is functionally connected to the computing device via a wired or wireless means, e.g., a USB cable or a Bluetooth connection.

Those skilled in the art appreciate that, in some other embodiments, the computing device 100 may have a software structure different than the software structure 140 describe above, depending on the hardware structure of the particular embodiment. For example, in an embodiment that the computing device 100 is a digital camera, the computing device 100 may not comprise apps running on top of an operating system. Rather, all software modules, including software modules corresponding to the operating system and those corresponding to aforementioned apps, are implemented as firmware in the computing device 100.

Although in above embodiments, the computing device 100 processes an image to correct purple color distortion, in some other embodiments, the computing device 100 may only process a portion of an image to correct purple color distortion. The portion to be processed may be a user designated portion of an image, or may be a predefined portion thereof. In a related embodiment, the computing device 100 processes multiple images in batch to correct purple color distortion therein. In such cases, the image array incorporates only the selected portion of the images.

Although in above embodiments, the computing device 100 processes the image to correct purple color distortion caused by excessive colors of R and B, in some other embodiments, the computing device 100 processes the image to correct other color distortion that is caused by excessive amount of other primary colors, e.g., excessive amount of R and G, or excessive amount of G and B.

Although in above embodiments, the computing device 100 loads a captured image from the imaging device 104, the computing device 100 may alternatively load an image from the storage 106. In a related embodiment, the computing device 100 may load an image from a remote computing device via a network, e.g., the Internet. In another related embodiment, the processed image may be displayed on a screen, or sent to a remote computing device via a network, depending on the design and user's commands.

In above embodiments, an integer function INT( ) and an integer division are used, because the value of each primary color is quantized, i.e., an integer between zero (0) and 255 in this embodiment. However, those skilled in the art appreciate that in other embodiments that primary color value may take a continuous value (i.e., an un-quantized real number), the integer function INT( ) is not required, and the division is a real-number division.

Although in above embodiments, a three-color model is used for representing digital images, those skilled in the art appreciate that, a color model using more than three colors, e.g., the Cyan, Magenta, Yellow, and Black (CMYK) color model, may be used to represent digital images in some alternative embodiments.

In these embodiments, for each pixel, a first color is selected as the base color, and a set of colors that are distorted and to be corrected (being at least a subset of the non-base colors) are scaled, each by a corresponding scaling factor (one or more scaling factors may take a value of one (1)). A minimum value is then determined from the scaled distorted colors. An adjustment value is set to zero if the minimum value is smaller than the base color, and otherwise is calculated as the difference between the minimum value and the base color. Each scaled distorted color is attenuated by subtracting the adjustment value therefrom, and then inversely-scaled using the corresponding scaling factor to obtain an adjusted, color distortion corrected value therefor. The pixel is then updated by using the adjusted, distortion corrected colors and the original value of other colors. The updated pixel is then repopulated to the pixel array.

What is claimed is:

1. A method for removing color distortion from a digital image for forming an adjusted, color distortion corrected image comprising:
    selecting an array of pixels from the digital image or portion thereof, each pixel being represented by a first, a second and a third primary color, each primary color having an intensity value;
    for each original pixel in the array:
        establishing a minimum value between the intensity values of the second and the third primary colors;
        comparing the minimum value and the intensity value of the first primary color, and where the intensity value of the first primary color is equal to or greater than the minimum value, establishing an adjusted pixel with the intensity values of the three primary colors equal to those of the original pixel, and
        where the intensity value of the first primary color is less than the minimum value,
            establishing an adjustment value, the adjustment value being the difference of the minimum value and the intensity value of the first primary color;
            attenuating the intensity value of the second primary color by the adjustment value, and
            attenuating the intensity value of the third primary color by the adjustment value for establishing an adjusted pixel, having the original intensity value for the first primary color and attenuated intensity values for the second and third primary colors; and
    repopulating the array with the adjusted pixels for forming the adjusted, color distortion corrected image.

2. The method of claim 1 further comprising:
    scaling at least one of the intensity values of the second and third primary colors by multiplying a respective scaling factor thereto, before establishing the minimum value; and
    inversely scaling the intensity value of the at least one scaled primary color by multiplying the inverse of the respective scaling factor, after the intensity value of the at least one scaled primary color is attenuated.

3. The method of claim 2 wherein said scaling factor is selected within the range of about 0.75 to about 1.33.

4. The method of claim 2 wherein said scaling factor is selected within the range of about 0.5 to about 2.0.

5. The method of claim 2 wherein said scaling factor is selected within the range of about 0.1 to about 1.0.

6. The method of claim 2 wherein said scaling factor is user-adjustable.

7. The method of claim 1 further comprising:
filtering said digital image or portion thereof to compensate for image sensor introduced artifacts before removing color distortion therein.

8. The method of claim 7 wherein said filter is a moving average filter.

9. The method of claim 8 wherein said moving average filter is a two pixel by two pixel moving average filter.

10. The method of claim 1, wherein the first, second and third primary color are green, red and blue, respectively, and the color distortion is purple.

11. A computing device for removing color distortion from a digital image for forming an adjusted, color distortion corrected image comprising:
a processing structure; and
a storage functionally coupled to said processing structure and storing said digital image; said processing structure executing computer-executable code for
selecting an array of pixels from the digital image or portion thereof, each pixel being represented by a first, a second and a third primary colors, each primary color having an intensity value;
processing each pixel of the selected pixels to remove color distortion; and
repopulating the array with the adjusted pixels for forming the adjusted, color distortion corrected image; wherein said processing comprises:
establishing a minimum value between the intensity values of the second and the third primary colors;
comparing the minimum value and the intensity value of the first primary color, and where the intensity value of the first primary color is equal to or greater than the minimum value, establishing an adjusted pixel with the intensity values of the three primary colors equal to those of the original pixel, and
where the intensity value of the first primary color is less than the minimum value,
establishing an adjustment value, the adjustment value being the difference of the minimum value and the intensity value of the first primary color;
attenuating the intensity value of the second primary color by the adjustment value, and
attenuating the intensity value of the third primary color by the adjustment value for establishing an adjusted pixel, having the original intensity value for the first primary color and attenuated intensity values for the second and third primary colors.

12. The computing device of claim 11 wherein said processing further comprises:
scaling at least one of the intensity values of the second and third primary colors by multiplying a scaling factor thereto, before establishing the minimum value; and
inversely scaling the intensity value of the at least one scaled primary color by multiplying the inverse of said scaling factor, after the intensity value of the at least one scaled primary color is attenuated.

13. The computing device of claim 11 wherein said processing further comprises:
filtering said digital image or portion thereof by using a two pixel by two pixel moving average filter, to compensate for image sensor introduced artifacts before removing color distortion therein.

14. The computing device of claim 11, wherein the first, second and third primary color are green, red and blue, respectively, and the color distortion is purple.

15. The computing device of claim 11 wherein said image is an image loaded from a storage.

16. The computing device of claim 11 further comprising a networking module for connecting to at least one remote computing device, and wherein said image is an image loaded from the at least one remote computing device.

17. The computing device of claim 11 further comprising an imaging device functionally coupled thereto, and wherein said image is an image captured by the imaging device.

18. The computing device of claim 11 wherein the computing device is selected from the group consisting of smart phone, tablet and digital camera.

19. A computer-readable storage device comprising computer-executable instructions for removing purple flare from a digital image for forming an adjusted de-purpled image, wherein the instructions, when executed, cause a processor to perform actions comprising:
selecting an array of pixels from the digital image or portion thereof, each pixel being represented by a green, a red and a blue primary color, each primary color having an intensity value; and
processing each pixel of the selected pixels to remove color distortion; and
repopulating the array with the adjusted pixels for forming the adjusted, color distortion corrected image; wherein processing each pixel of the selected pixels comprises:
establishing a minimum value between the red and blue intensity values;
comparing the minimum value and the green intensity value, and where the green intensity value is equal to or greater than the minimum value, establishing an adjusted pixel with the intensity values of the three primary colors equal to those of the original pixel, and
where the green intensity value is less than the minimum value,
establishing an adjustment value, the adjustment value being the difference of the minimum value and the green intensity value;
attenuating the red intensity value by the adjustment value, and
attenuating the blue intensity value by the adjustment value for establishing an adjusted pixel, having the original green intensity value and attenuated red and blue intensity values.

20. The computer-readable storage device of claim 19 wherein said processing each pixel of the selected pixels further comprises:
scaling one of the intensity values of the blue and red colors by multiplying a scaling factor thereto, before establishing the minimum value; and
inversely scaling the intensity value of the scaled color by multiplying the inverse of said scaling factor, after the intensity value of the scaled color is attenuated.

21. The computer-readable storage device of claim 19 wherein said processing each pixel of the selected pixels further comprises:
filtering said digital image or portion thereof by using a two pixel by two pixel moving average filter to compensate for image sensor introduced artifacts before removing purple flare therein.

22. A method for removing color distortion from a digital image for forming an adjusted, color distortion corrected image comprising:
- selecting an array of pixels from at least a portion of the digital image, each pixel comprising at least a first, a second and a third primary color, each primary color having an intensity value;
- for each original pixel in the array:
  - establishing a minimum value being the minimum intensity values of a group of colors comprising at least the second and the third primary colors;
  - comparing the minimum value and the intensity value of the first primary color, and where the intensity value of the first primary color is equal to or greater than the minimum value, establishing an adjusted pixel with the intensity values of all primary colors equal to those of the original pixel, and
  - where the intensity value of the first primary color is less than the minimum value,
    - establishing an adjustment value, the adjustment value being the difference of the minimum value and the intensity value of the first primary color;
    - attenuating the intensity value of each of the group of colors by the adjustment value for establishing an adjusted pixel, having attenuated intensity values for the group of colors and the original intensity value for other colors; and
- repopulating the array with the adjusted pixels for forming the adjusted, color distortion corrected image.

23. The method of claim 22 further comprising:
- scaling each of the intensity values of the group of colors by multiplying a respective scaling factor thereto, before establishing the minimum value; and
- inversely scaling each of the intensity values of the scaled colors by multiplying the inverse of the respective scaling factor, after the intensity value of the scaled color is attenuated.

24. The method of claim 23 wherein each of said scaling factors is selected within the range of about 0.1 to about 1.0.

25. The method of claim 24 wherein at least one of said scaling factors is equal to one.

26. The method of claim 22 wherein said processing further comprises:
- filtering said digital image or portion thereof to compensate for image sensor introduced artifacts before removing color distortion therein.

* * * * *